United States Patent
Hong

[15] 3,704,055
[45] Nov. 28, 1972

[54] PROJECTION SCREEN

[72] Inventor: Sung Kul Hong, Box 642, Fort Wayne Bible College, 1025 W. Rudisill Boulevard, Fort Wayne, Ind. 46807

[22] Filed: May 28, 1971

[21] Appl. No.: 148,036

[52] U.S. Cl..............................350/128, 350/125
[51] Int. Cl...........................................G03b 21/60
[58] Field of Search......350/117, 125, 127, 128, 129, 350/167, 320

[56] References Cited

UNITED STATES PATENTS

| | | | |
|---|---|---|---|
| 2,358,070 | 9/1944 | Holmes et al. | 350/129 X |
| 3,191,495 | 6/1965 | Miller | 350/128 |
| 2,618,198 | 11/1952 | Luboshez | 350/128 |
| 3,279,314 | 10/1966 | Miller | 350/129 |
| 3,180,214 | 4/1965 | Fox | 350/128 |
| 1,942,841 | 1/1934 | Shimizu | 350/128 |

FOREIGN PATENTS OR APPLICATIONS 180,418   5/1954   Austria......................350/128

*Primary Examiner*—Samuel S. Matthews
*Assistant Examiner*—Richard L. Moses
*Attorney*—Hood, Gust, Irish, Lundy & Coffey

[57] ABSTRACT

Disclosed is a projection screen for displaying optical images projected thereonto by a projector. The screen is formed from a multiplicity of optical cells juxtaposed to define a surface. Each of the cells is provided with a light converging lens having a predetermined radius of curvature and means disposed adjacent to the focal region of the lens for passing the light rays that are converged by the lens along lines passing through the focal region thereof. A mask means is disposed optically behind the lens for selectively absorbing light rays converged by the lens along lines extending through points laterally offset from the focal region of the lens in a direction perpendicular to an optical axis thereof, and a means is optically aligned with the light passing means for dispersing those light rays passed thereby.

18 Claims, 15 Drawing Figures

PATENTED NOV 28 1972
3,704,055
SHEET 1 OF 3
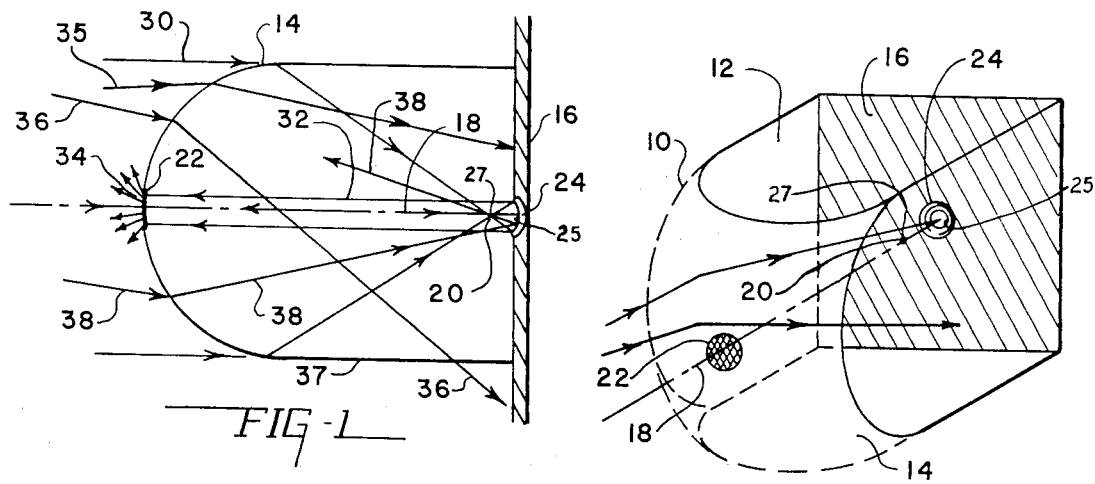
FIG-1
FIG-2
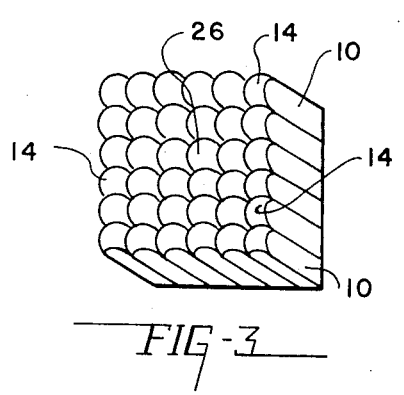
FIG-3
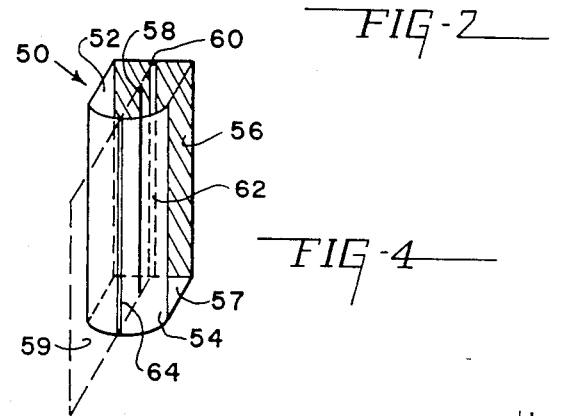
FIG-4
FIG-5
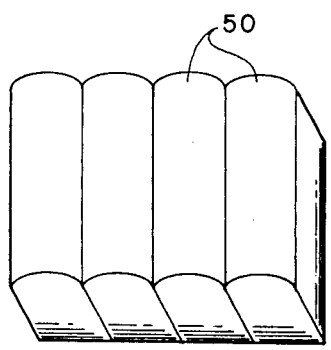
FIG-6
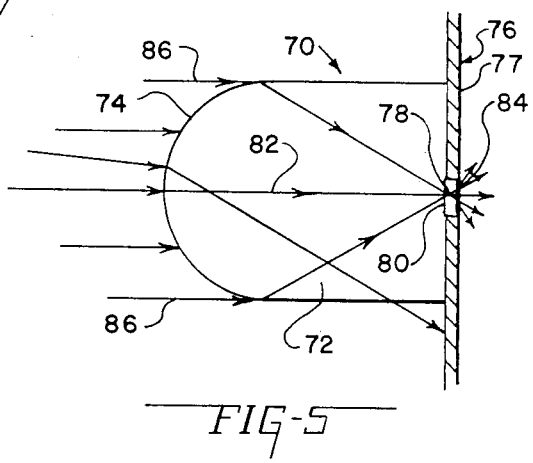
INVENTOR:
SUNG K. HONG
BY,
ATTORNEYS

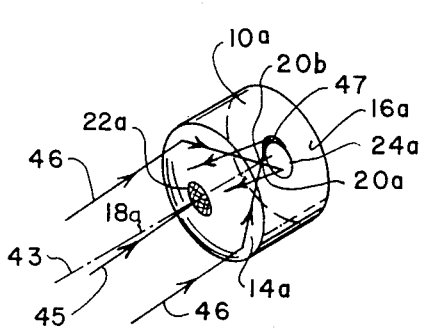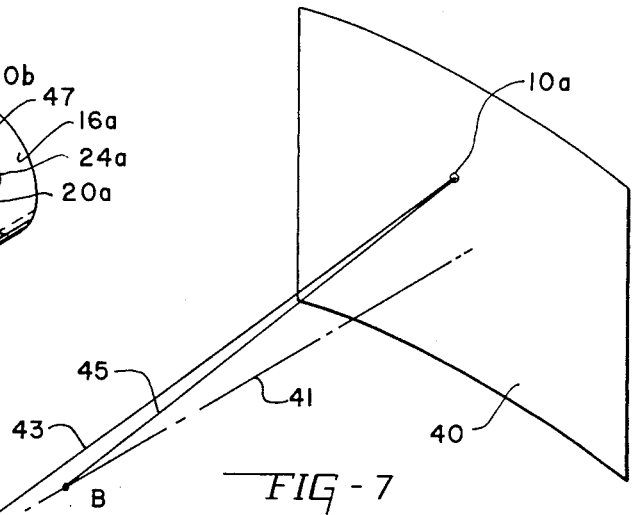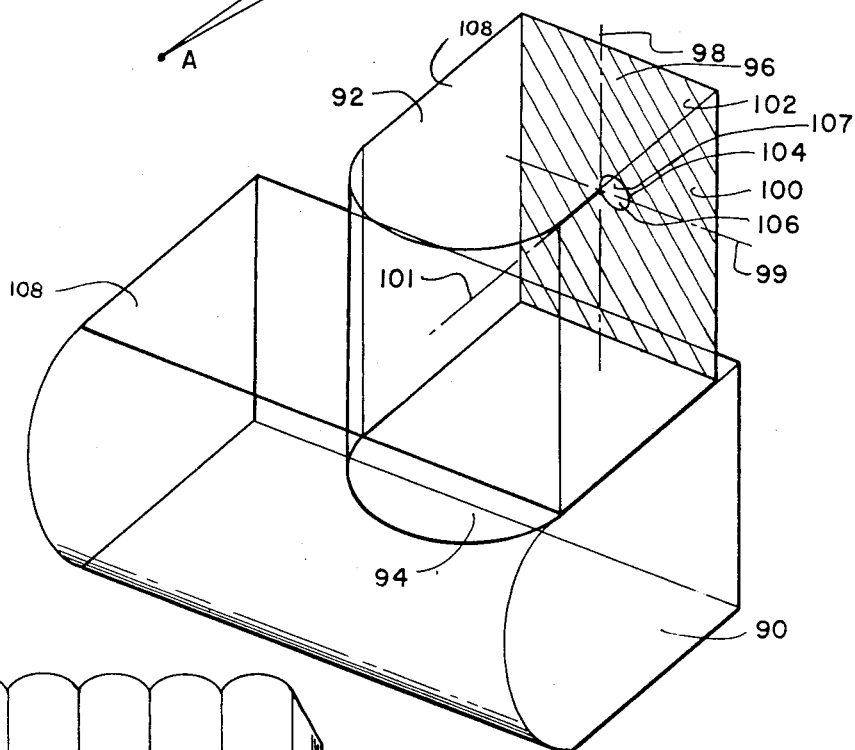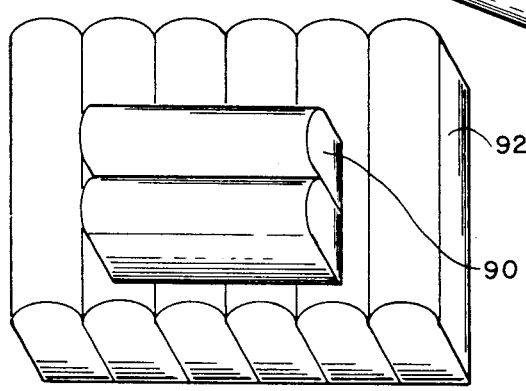

INVENTOR:
SUNG K. HONG
BY, Hood, Gust, Irish,
Lundy & Coffey
ATTORNEYS

PROJECTION SCREEN

BACKGROUND OF THE INVENTION

1. Field of the Invention

The invention relates generally to a screen for displaying an optical image projected thereonto by a projector and more particularly to an assemblage of optical cells for use in such a screen. Each cell exhibits a high degree of selectivity between light incident thereon from the projector and ambient light enabling use of the screen under high ambient light conditions.

2. Description of the Prior Art

Conventional projection screens used for displaying various types of pictures projected thereonto by a projector are widely used. Typically, such projection screens are provided with a reflective surface to enhance the capability of the projection screen to reflect the projected image. However, the reflective surface used on this type of projection screen is not selective of the light reflected thereby and, therefore, this type of screen must be used under subdued lighting conditions such as in a darkened movie theater or, when used out of doors, only after dark.

To overcome this problem, various forms of projection screens which comprise a multiplicity of optical cells of a size corresponding generally to the smallest picture element of the projected image have been proposed. However, due to the optical configuration of the cells used in these prior art screens, the screens lack either the desired degree of selectivity of the light that is reflected thereby, or the screen can be viewed only by an audience positioned within a narrow viewing area.

SUMMARY OF THE INVENTION

Broadly, the invention is a screen for displaying optical images projected thereonto by a projector. The screen comprises a multiplicity of optical cells juxtaposed to form a surface. Each of the cells of the screen is provided with a light-converging lens having a predetermined radius of curvature, and means is positioned in the image plane of the screen for dispersing light rays impinging thereupon. A light-passing means, by which is meant an optical device which passes those light rays received thereby without significant reduction in the intensity of the light, is disposed optically between the converging lens and the light-dispersing means for selectively passing only those light rays incident upon the lens in a direction generally parallel to a line (hereinafter referred to as the "line of projection") extending from the projector to the optical axis of the converging lens. Mask means are disposed on predetermined ones of the surfaces of the cell for selectively absorbing those light rays incident upon the refracting lens at oblique angles to the line of projection.

In a particular embodiment of the invention for use as a back-lit screen, the light-passing means includes a transparent aperture or window disposed adjacent the focal region of the lens, the aperture being of a size and shape proportioned to pass only those light rays incident upon the lens in a direction parallel to the line of projection. When used for a front-lit screen, the light-passing means includes a reflecting surface having its focal point or focal region coincident with the focal region of the lens, whereby light rays incident on the lens in a direction parallel to the line of projection pass through the common focal regions of the lens and the mirror and are rendered parallel and reflected backwardly thereby toward the surface of the lens. The light-dispersing means comprises a small area of translucent light-dispersing particles deposited over the aperture or on the surface of the lens, respectively, whereby parallel light rays transmitted to the light-dispersing means are dispersed or scattered enabling viewing of the screen at wide viewing angles.

It is therefore an object of the invention to provide an improved projection screen having greater ambient light rejection capabilities.

It is another object of the invention to provide such a screen which can be used under high ambient light conditions.

It is yet another object of the invention to provide such a screen which permits viewing of the projected image at wide viewing angles.

It is still another object of the invention to provide such a screen which can be constructed to be viewed from either front or back sides.

It is yet another object of the invention to provide an optical cell constituting part of such screen which is relatively simple in construction and economical to produce.

BRIEF DESCRIPTION OF THE DRAWINGS

The above-mentioned and other features and objects of the invention and the manner of attaining them will become more apparent and the invention itself will be best understood by reference to the following description of an embodiment of the invention taken in conjunction with the accompanying drawings, wherein:

FIG. 1 is an optical schematic of one embodiment of a cell used in the invention showing the position of the optical elements thereof;

FIG. 2 is a perspective view of an optical cell in accordance with the invention;

FIG. 3 is a perspective view showing a multiplicity of the cells combined to form a projection screen;

FIG. 4 is a perspective view of a modified optical cell incorporating a cylindrical lens in accordance with the present invention;

FIG. 5 is an optical schematic showing the cell of the invention modified for use in a back-lit or back-viewed projection screen;

FIG. 6 is a perspective view showing the manner of assembling optical cells illustrated in FIG. 4 to form a projection screen;

FIG. 7 is a perspective view of a projection screen incorporating the optical cells of the invention used in explaining a feature of the invention;

FIG. 7a is an enlarged fragmentary perspective view showing details of the cell of the projection screen of FIG. 7;

FIG. 8 is a perspective of yet another optical cell in accordance with the invention;

FIG. 9 is a fragmentary perspective view of a projection screen incorporating a multiplicity of the cells of FIG. 8;

DESCRIPTION OF THE PREFERRED EMBODIMENT

Figure 11:
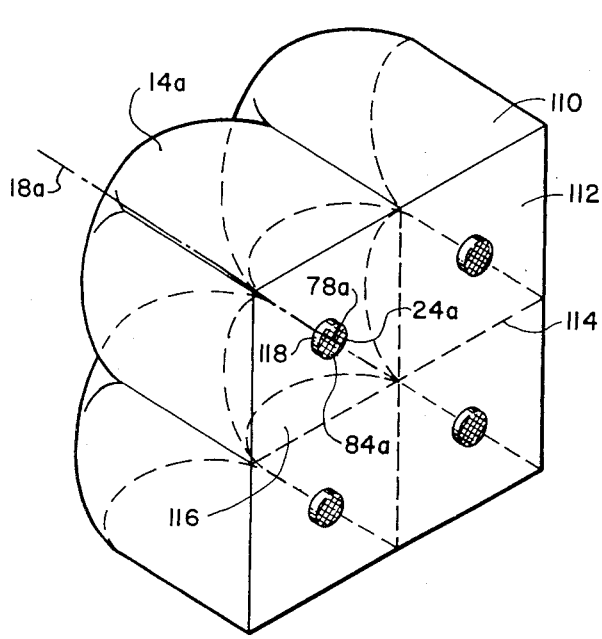
FIG. 11 is a perspective view of a portion of a projection screen showing an alternative manner of forming the back surface thereof.

Referring now to the drawings, there is illustrated an optical cell 10 comprising a generally rectangular block 12 of optically transparent material such as glass or clear plastic having a lens surface 14 and oppositely disposed, spaced-apart back mask surface 16.

Lens surface 14 has a generally spherical contour of predetermined radius of curvature whereby it functions as a convex lens having an optical axis 18 and focal point or focal region 20. The radius of curvature is so selected that focal point 20 is disposed closely adjacent to back mask surface 16 between lens surface 14 and back mask surface 16. Disposed on lens surface 14 coaxially of its optical axis 18 is a small, generally circular area 22 of light-dispersing material. This area may comprise a thin film of minute light-scattering particles such as small glass or plastic beads secured with a binder or any other form of translucent, light-dispersing material, such as frosted or etched glass, many such materials being well known in the art.

To provide a light-passing means, back mask surface 16 has formed therein a small, generally spherical concave surface 24 disposed coaxially of optical axis 18 of lens surface 14 and extending in a direction generally perpendicular thereto. This concave surface 24 is optically smooth and is coated with a thin film of highly reflective material such as silver or an aluminum oxide to form a spherical mirror 25. The radius of curvature of this surface is selected such that the focal point of the mirror 25 is coincident with focal point 20 of lens surface 14. Further, concave mirror 25 has the same "$f$" value as lens surface 14. That is, the ratio of the diameter of the lens surface 14 and concave mirror 25 to their focal lengths, respectively, are identical. The remainder of back mask surface 16, that is, all portions of surface 16 except concave surface 24, are covered with an opaque, light-absorbing material such as flat black paint.

When used in a projection screen, a multiplicity of optical cells 10 are secured together as shown in FIG. 3 with a suitable matrix to form a large, generally planar surface, the frontal or image surface 26 thereof comprising a multiplicity of surfaces 14 of the individual cells 10.

Referring now to FIG. 1, it is seen that light rays indicated by arrows 30 incident upon lens surface 14 in a direction generally parallel to optical axis 18 thereof are converged thereby toward focal point 20. The light rays 30 pass through focal point 20, diverge therefrom, and impinge upon concave mirror 25. Since the concave mirror 25 has a radius of curvature selected such that its focal point or focal region 27 is also at point 20, light rays 30 are rendered parallel or collimated thereby as at 32 and transmitted or passed on back toward light-dispersing area 22 on lens surface 14. When the light rays 32 strike light-dispersing area 22 they are scattered or multi-directionally defracted by the surface 22 as indicated by arrows 34. Light rays indicated generally by arrows 35 which are incident upon lens surface 14 at oblique angles to optical axis 18 thereof are converged by lens surface 14 but do not pass through focal points 20, 27 due to their angle of incidence upon lens surface 14, whereby light rays 35 strike back mask surface 16 and are absorbed thereby. Light rays 36 which are incident upon lens surface 14 at large oblique angles to optical axis 18 will be defracted along lines which cause the light rays 36 to exit from the cell through the side walls 37 thereof. It will be apparent therefore, that by reason of the juxtaposition of the cells 12, a portion of the light rays 36 which exit from the cells 12 through the side walls 37 thereof may impinge upon the concave mirror 25 of an adjacent cell and be reflected thereby, thus deteriorating the ability of the screen to reject ambient light. To overcome this effect, the side surfaces 37 of each of the cells 12 are also coated with an opaque, light absorbing material such as flat black paint before assembly of the cells into a screen, whereby light rays 36 which would otherwise exit through the side walls of the cells 12 will strike and be absorbed by the light absorbing material on the side surfaces 37.

Figure 14:
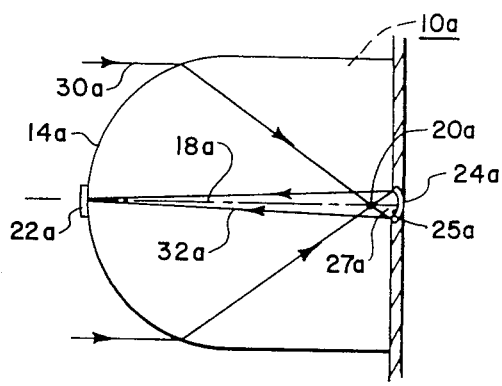
FIG. 14 is an optical schematic of the optical cell of FIG. 2 showing a modification thereof.

A third group of light rays indicated generally by arrows 38 which are incident upon lens surface 14 at small oblique angles to optical axis 18 thereof are converged by lens surface 14 at angles which cause the light rays 38 to impinge upon and be reflected by concave mirror 25. However, these light rays 38 will not pass through focal point 27 of concave mirror 25 and therefore will not be rendered parallel thereby and will not be transmitted in a direction toward or strike light-dispersing area 22. The quantity of light in the third group will, of course, be inversely proportional to the diameter of concave mirror 25, and, therefore, mirror 25 should be positioned as close to focal point 20 as possible enabling mirror 25 to be made as small as possible. Lens surface 14 will have a focal length at least several times as long as the focal length of mirror 25. Referring now to FIG. 14, it will also be apparent that the concave mirror 25a can be positioned with its focal region 27a positioned a small dimension optically behind the focal region 20a of convex lens surface 14a whereby the light rays 32a reflected thereby, rather than being rendered parallel, will be converged towards a point coincident with lens surface 14a. By reason of the light rays 32a being convergent, it can be seen that light-dispersing area 22a can be made correspondingly smaller than in the embodiment shown schematically in FIG. 1.

In the preceding discussion, it has been assumed that all of the light rays which are incident upon the projection screen from the projector are incident upon the individual cells in a direction parallel to the optical axes thereof. It is therefore apparent that each of the optical cells 10 in the projection screen must be secured in the screen 40 (FIG. 7) in a position wherein its optical axis 18 is essentially parallel to the line of projection to that cell. This can be accomplished by either forming the projection screen to the contour of a portion of a sphere having the projector at its center, or, if the projection screen is flat, by orienting each cell 10 therein in a position wherein its optical axis 18 is parallel to the line of projection from the projector to that particular cell.

Referring now to FIGS. 7 and 7a, there is illustrated an optical cell 10a which is laterally offset from the optical axis 41 of the projection screen 40 and having the optical axis 18a of its lens surface 14a disposed generally parallel to the line of projection 43 which extends from a projector positioned at point A. If the projector (not shown) is now moved from point A to point B, it is seen that the new line of projection 45 will not be parallel to the optical axis 18a of its lens surface 14a. Correspondingly, the light rays 46 incident upon lens surface 14a in a direction parallel to line of projection 45 will not be refracted and converged through the focal point 20a of the cell 10a thereof when the projector is at point B, but rather, will converge through a point 20b which is displaced a small distance laterally from focal point 20a. Subsequently, all of the light rays 46 which are incident upon lens surface 14a from the projector will not be directed onto concave mirror 24a, and a portion of these light rays indicated generally by shaded area 47 will fall upon and be absorbed by mask surface 16a. If, however, concave mirror 24 is formed in the shape of an elongated circle (i.e., area of concave mirror 24a and area 47) which corresponds to the pattern or shape traced by the cross-section of the light rays 46 in the plane of mask surface 16a as the projector is moved from point A to point B, all of the light rays 46 will be directed onto the concave mirror 24 for all positions of the projector between point A and point B and be reflected or passed thereby toward light-dispersing area 22a. It will further be apparent that the reflected light rays will not be passed backwardly in a direction parallel to optical axis 18a of lens surface 14a, but rather, will be passed backwardly at a small oblique angle with respect to axis 18a. Therefore, light-dispersing surface 22a is also formed in the shape of an elongated circle of generally the shape of concave mirror 24a. By thus forming the concave mirror 24a and light-dispersing area 22a, the optical cell 10a will function efficiently and only a negligible portion of the light rays 45 incident thereon will be lost for all positions of the projector between point A and point B, the losses, of course, being attributable to the small amount of distortion and imperfect collimation of light rays 46 by the concave mirror 24a which results from the light rays being incident upon the lens surface 14a and concave mirror 24a at small angles with respect to their optical axes 18a.

Basic geometry further dictates that the aforementioned pattern, i.e., the amount of elongation of concave mirror 24a and light-dispersing area 22a, will vary in direct proportion to the displacement of the particular cell 10a from the optical axis 41 of the projection screen 40. Thus, the concave mirror surfaces 24a will have varying dimensions depending upon the lateral displacement of the particular cell 10a of which it is a part from the axis of projection 41.

Thus, to produce a projection screen utilizing the optical cell 10 as above described in which all of the concave mirrors 24 have the proper dimensions, it is preferable that the light-absorbing material on back mask surface 16 and the reflective coating of the mirrors not be applied until all of the cells have been assembled to form a complete projection screen 40. The light absorbing material on the side surfaces 37 must of course be applied before the cells are assembled. Accordingly, the concave surfaces 24 for all of the mirrors 25 are made oversized by a dimension which will include the perimeter of the largest of the concave mirrors 25 to be formed thereon. The mask surfaces 16 including the concave surfaces 24 are then coated with a photo resist material and light is projected onto the screen with a projector in a darkened room and the projector simultaneously moved from point A to point B. This will cause the photo resist material to be exposed on each of the concave surfaces in a pattern exactly corresponding to the pattern of light formed by lens surfaces 14 for all positions of the projector between points A and B. The exposed photo resist material is selectively etched away in a well known manner and the exposed area silvered or the like to form concave mirrors 25 each of which will have the proper shape and dimensions for the cell with which it is associated. If the photo resist material is not also a satisfactory light-absorbing material, the unexposed photo resist material can be subsequently selectively removed from the cells and a light-absorbing coating applied to the back surface of the projection screen.

Referring now to FIG. 4, there is illustrated a modified optical cell 50 in accordance with the present invention. In this embodiment, the cell comprises an elongated rectangular body of optically transparent material 52 having a cylindrical refracting surface 54 and a spaced-apart back mask surface 56. The cylindrical refracting surface 54 will not have a single focal point 20 and an optical axis 18, but rather, has a focal line 58 and optical plane 59. The focal line 58 or focal region is disposed optically between cylindrical lens surface 54 and mask surface 56, and mask surface 56 has an aperture or window 60 which is in the shape of a long line of finite width as shown. Within this aperture there is formed a concave, cylindrical reflecting surface 62 which has its focal line coincident with focal line 58 of cylindrical surface 54.

Formed on cylindrical refracting surface 54 is an area 64 of light-dispersing material as above described but in this embodiment the light-dispersing area 64 has the pattern of a line of finite width having a size and shape essentially equal to that of aperture 60.

This embodiment has the advantage of being simpler in construction than the embodiment of FIGS. 1 through 3, however, it is apparent that the arrangement of the optical elements of the cell render it nonselective to light rays incident upon cylindrical surface 54 in a direction parallel to the focal plane 59. However, the optical cell of this embodiment will be fully as selective of light rays incident upon cylindrical surface 54 at oblique angles to focal plane 59.

To form a projection screen with the cylindrical cells illustrated in FIG. 4, the cells are placed in juxtaposition as shown in FIG. 6 and secured with a suitable matrix. Again, the side surfaces 57 of the cells 50 should be coated with light absorbing material to prevent light from one cell passing outwardly through side walls 57 and being reflected by the reflecting surface 62 of an adjacent cell. Using the cells 50, the projection screen should be formed to the contour of a cylinder having its axis passing through to the position of the projector, whereby the optical planes 59 of all the cells 50 thereof will be parallel to the lines of projection to all of the cells.

In both of the above described embodiments the individual cells should have dimensions no larger than the minimum picture element projected thereonto. This is because the picture viewed by the audience will not be the projected image focused onto the screen, but a composite of small spots or lines of light, one spot or line for each cell of the screen. Thus if each cell has a dimension corresponding to the smallest detail of the picture to be viewed, or alternatively, the smallest detail of the picture which is discernible by the human eye, there will be no deterioration in the quality of the viewed image. This size will of course vary as a function of the viewing distance and size of the screen.

Again, if it is desired to provide a projection screen which can be used with projectors positioned at a range of distances away from the surface of the screen, the width of apertures 60 of cells 50 will have to be formed to the shape of the pattern traced by the cross-section if the light rays 30 incident thereon as the projector is moved between the extremities of its range of movement. In this case, this requires that the apertures 60 and/or concave mirrors 62 be made wider in a direction and amount corresponding to the movement of the aforementioned cross-section as the projector is moved. Proper formation of the apertures 60 and concave mirrors 62 can, of course, be achieved as set forth above in reference to FIGS. 7, 7a.

Figure 10:
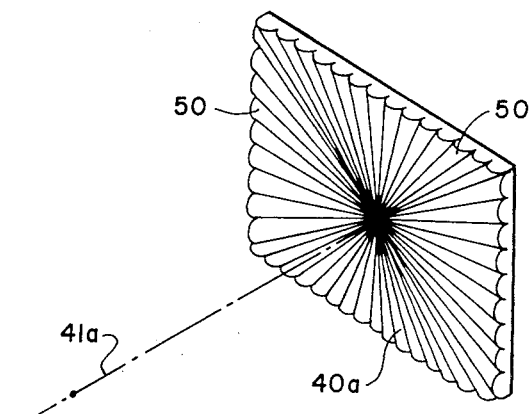
FIG. 10 is a perspective view showing an alternative assembly of the optical cells of FIG. 4 to form a projection screen.

As an alternative to forming the apertures 60 or concave mirrors 62 of the cells 50 to conform to the pattern traced by the cross-section of the light rays 30 incident thereon as the projector is moved between the extremities of its range of movement, the cells 50 can be arranged in a radial array as shown in FIG. 10 wherein the optical planes 59 and focal lines 58 of the cells 50 will extend radially outwardly from the axis of projection 41a of the projection screen 40a. When the cells 50 are so arranged it can be seen that, irrespective of the position of the projector (not shown) along axis of projection 41a, the lines of projection from the projector to the individual cells will always be parallel to the focal planes 59 of all of the cells. Therefore, for all positions of the projector along the axis of projection 41a, the cross-sectional pattern of the light rays converged by the lens surfaces 54 will be a constant thereby obviating any need to enlarge or otherwise modify the shape of the light transmitting means 62.

Referring now to FIG. 5 there is shown schematically an optical cell 70 in accordance with the invention which is adapted for use as back-lit or back-side projection screen, that is, a projection screen wherein the image is projected thereonto from one direction and the image is viewed from the opposite direction. The cell 70 comprises a generally rectangular block 72 of optically transparent material having spaced-apart and oppositely disposed lens surface 74 and back mask surface 76. Lens surface 74 is the same as lens surface 14 described above in reference to FIGS. 1 and 2 except that its radius of curvature is selected such that its focal point 78 is coincident with mask surface 76.

Mask surface 76 has a thin film 77 of opaque, light-absorbing material thereon. To provide light-passing means, transparent aperture or window 80 is formed in surface 76 which is disposed coaxially of optical axis 82 of lens surface 74 and has a size and shape corresponding to the cross-section of light rays 86 in the plane of mask surface 76.

There is formed on mask surface 76 a thin film of light-dispersing material 84 as above described in registry with light-passing aperture 80.

It is thus seen that light rays indicated by arrow 86 which are incident upon convex lens surface 74 in a direction generally parallel to the optical axis 82 thereof are converged thereby and intersect at the focal point 78 of lens surface 74. Because the projector (not shown) will be positioned at a distance away from the optical cell 70 significantly greater than the focal length of lens surface 74, the light rays 86 impinging upon lens surface 74 from the projector can again be assumed parallel, and therefore, lens surface 74 will direct all of light rays 86 from the projector along lines passing through focal point 78. Further, because the aperture is transparent, light rays 86 will pass therethrough and strike the light-dispersing surface 84 and be scattered thereby. It is thus seen that, when the cell is viewed from the right (as shown in FIG. 5), the light radiating from light-dispersing area 84 will correspond to that portion of the projected image which is incident upon lens surface 74.

Light rays which are incident upon convex lens surface 74 at angles oblique to optical axis 82 thereof will be refracted by lens surface 74 but will not converge at focal point 78 thereof, and therefore, will not pass through aperture 80 and will be absorbed by light-absorbing surface 76.

As with the embodiment illustrated in FIGS. 1 through 3, the optical cell of FIG. 5 can be formed with either a spherical lens surface as in the embodiment of FIG. 2, or alternatively, can be formed with a cylindrical lens surface as shown in FIG. 4 and the side surfaces of the cells coated with light-absorbing material. If a cylindrical cell is used, the aperture 80 thereof will be in the shape of a long line as opposed to a small circular area. Elongation or enlargement of the aperture 80 to allow for movement of the projector along the optical axis of the projection screen can be effected as set forth above, whereby the aperture 80 will be enlarged in one direction.

Referring now to FIGS. 8 and 9, there is illustrated yet another embodiment of the invention, suitable for use in a backlit projection screen, which utilizes two layers of cylindrical lenses 90 and 92 and functions optically in a manner similar to the embodiment of FIG. 5 which uses a spherical lens. In this embodiment, the cells of layer 92 are constructed as illustrated in FIG. 8, and include a cylindrical lens surface 94 and spaced-apart back mask surface 96. Lens surface 94 has a radius of curvature as described in the embodiment of FIG. 4 and has a corresponding focal line 98. Mask surface 100 is constructed in the manner described above in conjunction with FIG. 5 and includes an opaque, light-absorbing layer 102 having a circular aperture 104 therein.

The other lens cells 90 are disposed optically in front of cells 92 and have a radius of curvature selected such that the focal line 99 thereof intersects focal line 98 of lens surface 94 of cells 92. It is thus seen that cylindrical lens surfaces of cells 90 and 92, by reason of their orthogonal relationship, will have the same effect, optically, on light rays incident thereon as the spherical lens surface 14 of the cell illustrated in FIG. 2. Similarly, a plurality of cells 92 and 90, when assembled as illustrated in FIG. 9, will have the same optical effect as a screen formed of the cells of FIG. 5.

Transparent aperture 107 has light-dispersing area 84a formed coincident therewith. The screen formed using criss-cross cylindrical cells will function as a back-lit projection screen. Again, the side surfaces 108 of cells 92 should also be coated with light absorbing material to prevent passage of light from one cell to an adjacent cell.

In each of the embodiments described above it has been assumed that each of the cells of the projection screen such as cells 10 of FIG. 2 and cells 50 of FIG. 4, have been individually fabricated thereby making it possible to apply a film of light absorbing material to the side surfaces of the individual cells to prevent the passage or transmission of light from one cell into an adjacent cell. It is, however, apparent that an entire projection screen or portions thereof which include a multiplicity of cells could be formed in a single molding operation or as a continuous sheet by means of suitable machine rolls having the pattern of the surfaces of the screen formed therein. When the projection screen is thus formed it will be impossible to apply a film of light absorbing material to the side surfaces of the individual cells since in fact all of the cells will be but a portion of a single, homogeneous body of material.

Figure 12:
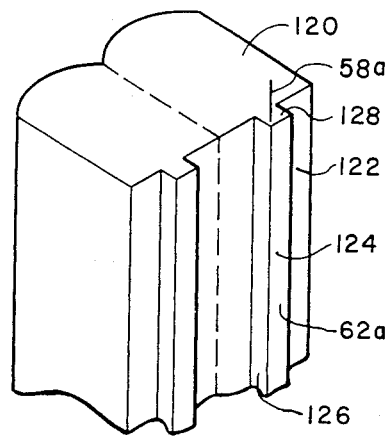
FIG. 12 is a perspective view of another alternative manner of forming the back surface of a screen incorporating the cells of FIG. 4.
Figure 13:
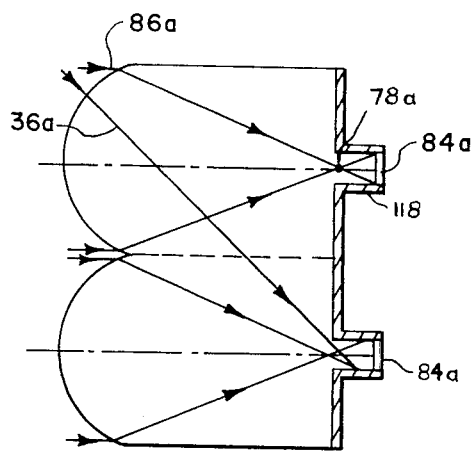
FIG. 13 is an optical schematic of a portion of the screens of FIGS. 11 and 12.

To overcome this problem, the multiple cell units are made in accordance with FIGS. 11, 12, and 13. Referring specifically to FIG. 11, there is illustrated a portion of a projection screen 110 which includes four cell segments 112 as indicated by dotted lines 114. While only four cell segments are shown it is obvious that the screen can include therein any number of the segments 112. EAch of the segments 112 is equivalent to one individual cell as described in conjunction with FIG. 2. However, the back mask surface 116 of each segment is further provided with a cylindrical protrusion 118 which extends outwardly from mask surface 16 coaxially of the optical axis 18a of the corresponding lens surface 14a of the particular segment 112. These protrusions 118 are formed as integral, homogeneous portions of screen 110 and are similarly made of the same optically transparent material. The light passing means 24a is formed on the distal end of each protrusion 118 as shown, this area again being disposed closely adjacent to the focal point 78a of the corresponding lens surface 14a. The cylindrical wall of each protrusion 118 is coated with a light absorbing material, this being the same material that is applied to back mask surface 116. It is thus seen that the cylindrical walls of protrusions 118 function as masks or light traps which prevent light rays such as 36a (FIG. 13) exiting through the side walls of adjacent cells from striking the light dispersing area 84a, or alternatively, the light transmitting means 24a of the segment.

Similarly, as can best be seen in FIGS. 12, in the embodiment incorporating cylindrical lens surfaces, each of the cell segments 120 is provided on the back mask surface 122 thereof with an elongated protrusion 124 of rectangular cross-section which is disposed symmetrically about the focal line 58a of the cell segment 120. Again, the side walls 126, 128 of rectangular protrusions 124 are coated with a light absorbing material, thereby enabling them to act as masks which prevent light defracted by the lens surface of adjacent cells from striking the light passing means 62a of the cell 120.

It can thus be seen that the optical cells constructed in accordance with the present invention provide a high degree of selectivity between those light rays incident upon the lens surfaces in a direction parallel to a line of projection extending from the projector to the cell while rejecting essentially all of the light rays incident thereon at angles that are oblique to this line. For this reason, the light rays incident upon cells from the projector which impinge upon the cells in a direction generally parallel to the aforementioned line are reflected and/or reradiated thereby. Further, because this light is concentrated onto a small area, it has an increased intensity. Simultaneously, ambient light, such as for example sunlight, will impinge upon the cells at oblique angles to the aforementioned line and will be absorbed by the screen. Consequently, the screen can be used under non-subdued lighting conditions such as daylight without seriously deteriorating the quality of the picture as viewed by the audience.

The cells of the invention can be easily fabricated from plastic material and both the convex lens surface and concave mirror surface can be formed in a single molding operation. A simple coating operation is required to form the mask surfaces. In the case of the cells which incorporate a cylindrical lens surface, it will be apparent that the cells can be formed in multiple cell widths using conventional extruding or rolling techniques.

While there have been described above the principles of this invention in connection with specific apparatus, it is to be clearly understood that this description is made only by way of example and not as a limitation to the scope of the invention.

What is claimed is:

1. A projection screen for displaying optical images projected thereonto by a projector comprising a multiplicity of optical cells, each of said cells comprising a spherical convex light-converging lens having a predetermined radius of curvature, means disposed coaxially of an optical axis of said lens and adjacent the focal region thereof for selectively passing those light rays converged by said lens along lines passing through the focal region thereof, said light-passing means including a generally circular surface of light-passing medium disposed generally perpendicular to an optical axis of said lens, mask means including an opaque film of light-absorbing material adhered to predetermined ones of the surfaces of said cell for selectively absorbing those light rays converged by said lens along lines extending through points laterally offset from said focal region, said light-passing surface having a size and shape corresponding to the pattern traced by said first mentioned light rays as the projector is moved a predetermined distance along an axis parallel to and laterally offset from said focal region, and means optically aligned with said light-passing means for dispersing those light rays passed by said light passing means, said cells being secured together in juxtaposition in a position wherein said lenses define a surface.

2. The screen of claim 1 wherein each of said cells is secured in the screen in a position wherein the optical axes of all of said lenses pass through a common point.

3. The screen of claim 2 wherein said screen is formed to conform to the contour of a portion of a sphere.

4. The screen of claim 2 wherein said screen is formed to conform to the contour of a portion of a cylinder.

5. A projection screen for displaying optical images projected thereonto by a projector comprising a multiplicity of optical cells, each of said cells comprising a cylindrical light-converging lens having a predetermined radius of curvature, means disposed coaxially of an optical axis of said lens and adjacent to the focal region thereof for selectively passing those light rays converged by said lens along lines passing through the focal region thereof, said light-passing means including a surface of light-passing medium disposed generally perpendicular to an optical axis of said lens, said light-passing surface having the shape of a line of finite width, mask means including an opaque film of light-absorbing material adhered to predetermined ones of the surfaces of said cell for selectively absorbing those light rays converged by said lens along lines extending through points laterally offset from said focal region, said light-passing surface having a size and shape corresponding to the pattern traced by said first mentioned light rays as the projector is moved a predetermined distance along an axis parallel to and laterally offset from said focal region, and means optically aligned with said light-passing means for dispersing those light rays passed by said light passing means, said cells being secured together in juxtaposition in a position wherein said lenses define a surface.

6. The screen of claim 5 wherein said light-passing surface is a transparent, generally circular window, said screen further comprising a multiplicity of second optical cells optically overlying said first mentioned optical cells, each of said second cells including a convex, cylindrical lens having its focal line disposed in optically orthogonal relationship with respect to the focal lines of said first cells, said light-dispersing means including a plurality of discrete areas of light-scattering particles coincident with said transparent windows, said windows being disposed on those surfaces of said first mentioned optical cells oppositely disposed from the lens surfaces thereof and coaxially of lines extending perpendicular to the focal lines of said first and said second cells and through the point of intersection thereof.

7. A projection screen for displaying optical images projected thereonto by a projector comprising a multiplicity of optical cells, each of said cells comprising a light-converging lens having a predetermined radius of curvature, means disposed coaxially of an optical axis of the said lens and adjacent to the focal region thereof for selectively passing those light rays converged by said lens along lines passing through the focal region thereof, said light-passing means including a concave reflecting surface disposed generally perpendicular to an optical axis of said lens, mask means including an opaque film of light-absorbing material adhered to predetermined ones of the surfaces of said cell for selectively absorbing those light rays converged by said lens along lines extending through points laterally offset from said focal region, and means optically aligned with said light-passing means for dispersing those light rays passed by said light-passing means, said cells being secured together in juxtaposition in a position wherein said lenses define a surface.

8. The screen of claim 7 wherein said lens is spherical and said concave reflecting surface is a spherical mirror, said mirror being positioned coaxially of the optical axis of said lens and optically behind said focal region by a dimension equal to the focal length of said spherical mirror, said passed light rays being rendered parallel by said mirror.

9. The screen of claim 7 wherein said lens is cylindrical and said concave reflecting surface is a cylindrical mirror, said mirror being positioned with its focal region coincident with the focal region of said cylindrical lens, said passed light rays being rendered parallel thereby.

10. A projection screen for displaying optical images projected thereonto by a projector comprising a multiplicity of optical cells, each of said cells comprising a light-converging lens having a predetermined radius of curvature, means disposed coaxially of an optical axis of the said lens and adjacent to the focal region thereof for selectively passing those light rays converged by said lens along lines passing through the focal region thereof, said light-passing means including a surface of light-passing medium disposed generally perpendicular to an optical axis of said lens, mask means including an opaque film of light-absorbing material adhered to predetermined ones of the surfaces of said cell for selectively absorbing those light rays converged by said lens along lines extending through points laterally offset from said focal region, and means optically aligned with said light-passing means for dispersing those light rays passed by said light-passing means, said light-dispersing means including a film of translucent light-scattering particles disposed coaxially of an optical axis of said lens, said film having an area substantially smaller than the surface area of said lens, said cells being secured together in juxtaposition in a position wherein said lenses define a surface.

11. The screen of claim 10 wherein said light-dispersing means has a size and shape of generally the same shape of said light-passing surface.

12. The screen of claim 10 wherein said light-dispersing film has a size and shape corresponding to the pattern traced by the cross-section of said passed light rays in the plane including said light-dispersing film as the projector is moved along an axis parallel to and laterally offset from an optical axis of said lens.

13. The screen of claim 7 wherein said light-dispersing means includes a film of translucent light-scattering particles disposed coaxially of an optical axis of said lens and on the surface thereof.

14. The screen of claim 13 wherein the focal lines of all of the optical cells extend radially outwardly from the axis of projection of the screen.

15. A projection screen for displaying optical images projected thereonto by a projector comprising a generally planar body of homogeneous, light-absorbing material having a lens surface and a parallel, spaced-apart back surface, said lens surface including a multiplicity of juxtaposed convex lens portions, said back surface having thereon a multiplicity of upstanding protrusions, each said protrusion having at least one side surface and a distal end surface, there being one of said protrusions for each convex lens portion, each said protrusion being disposed generally coaxially of the focal region of the corresponding one of said lens portions, means coincident with the distal end surfaces of said protrusions for selectively passing those light rays incident on said lens surfaces in a direction essentially parallel to the optical axes thereof, mask means including a film of light-absorbing material adhered to said back surface and said side surfaces of absorbing those light rays incident on said lens surface at oblique angles to the optical axes of said lens portions, and means optically aligned with said light passing means for dispersing those light rays passed by said light passing means.

16. The screen of claim 15 wherein said lens portions are generally spherical and said protrusions are cylindrical.

17. The screen of claim 15 wherein said lens portions are generally cylindrical and said protrusions are elongated ridges of rectangular cross-sections.

18. For use in a projection screen for displaying optical images projected thereonto by a projector, an optical cell comprising a generally rectangular block of optically transparent material having a convex lens surface and an oppositely disposed back mask surface, said back mask surface being generally parallel to and spaced apart from said lens surface by a predetermined dimension, the focal length of said lens surface being equal to or shorter than said predetermined dimension, said back mask surface having a film of opaque, light-absorbing material adhered thereto, a surface of light-passing material disposed coaxially of an optical axis of said lens and extending in a direction generally perpendicular thereto, the size and shape of said light-passing surface corresponding to the cross-section of those light rays converged by said lens surface along lines passing through the focal region thereof, whereby said light-passing surface selectively passes only those light rays incident upon said lens surface in a direction generally parallel to the line of projection thereof and said mask surface selectively absorbs those light rays incident upon said lens surface at oblique angles to said line of projection, and light-dispersing means disposed in optical alignment with and optically behind said light-passing surface for receiving and scattering light rays passed thereby.

* * * * *